United States Patent Office 3,174,295
Patented Mar. 23, 1965

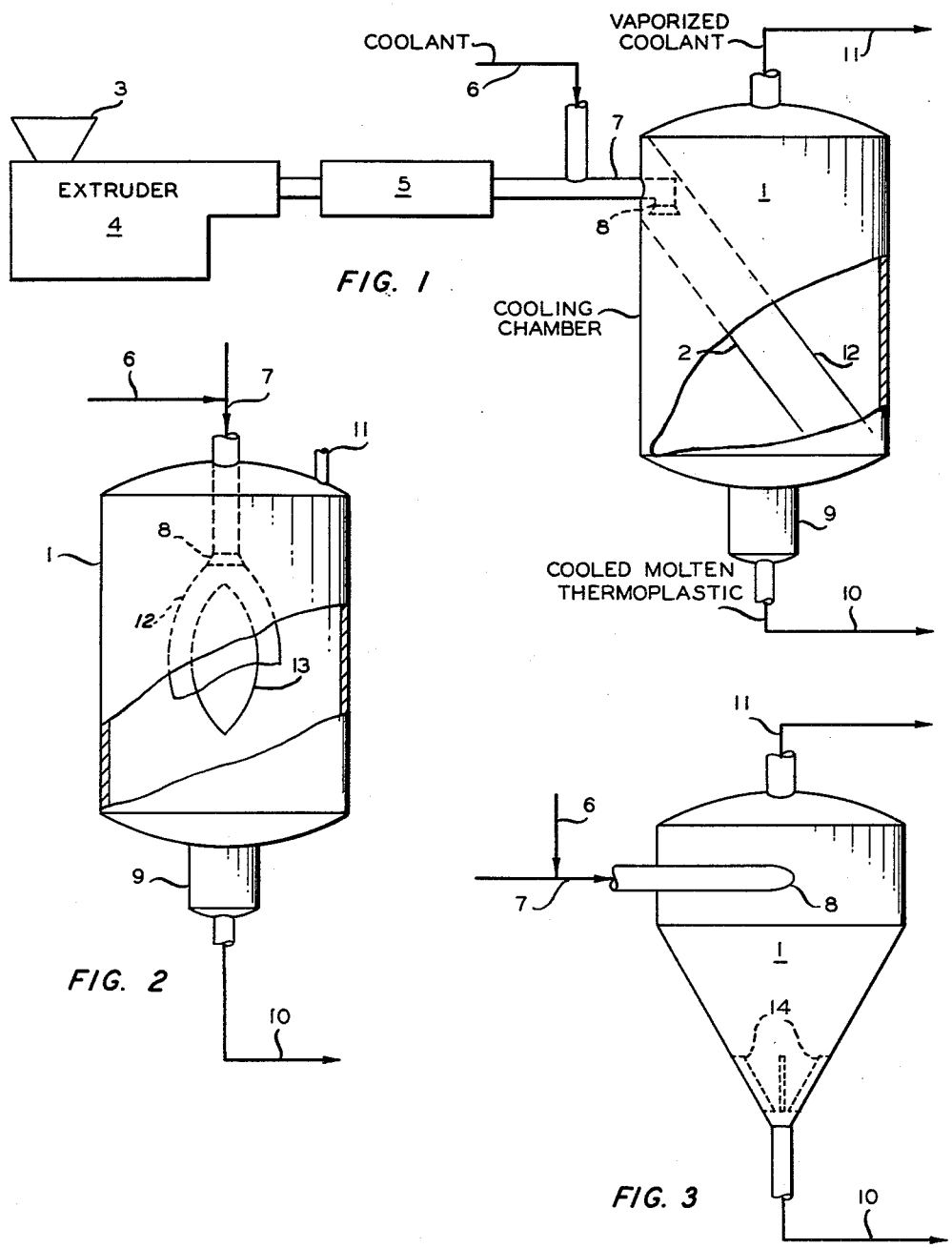

3,174,295
METHOD AND APPARATUS FOR COOLING MOLTEN THERMOPLASTIC MATERIALS
Harold M. Hawkins and Edward R. Beck, Bartlesville, Okla., assignors to Phillips Petroleum Company, a corporation of Delaware
Filed Sept. 5, 1961, Ser. No. 136,073
8 Claims. (Cl. 62—56)

This invention relates to the cooling of thermoplastic materials. One aspect of this invention relates to a method of cooling molten thermoplastic materials. Another aspect of this invention relates to an apparatus for cooling molten thermoplastic materials.

In the processing of many thermoplastic materials it is desirable to partially cool the molten material to a lower temperature and yet keep it in a molten state for subsequent treatment. It is known in the art that it is often desirable to convert polymers of high molecular weight and high density to materials having lower molecular weight to improve the processing qualities such as extrudability and moldability. One well known and widely used method for such a conversion is pyrolysis or viscosity-breaking of the thermoplastic material. The viscosity-broken polymer obtained in such a process is very hot and must be cooled before it can be effectively extruded or molded. In the past the hot viscosity-broken polymer has been cooled in conventional heat exchanges or quenched in a coolant. However, the thermoplastic materials are poor conductors of heat and conventional heat exchanger methods sometimes prove unsatisfactory because rapid cooling cannot be effected. Thus, undesired degradation of the thermoplastic material sometimes occurs at high temperatures before the cooling is effected.

It has now been discovered that molten thermoplastic materials can be effectively and conveniently cooled by contacting them with a vaporizable coolant in a novel cooling chamber. The resulting cooled thermoplastic material will be in a molten state at a temperature that will allow it to be easily extruded, molded, or otherwise treated.

Therefore an object of this invention is to provide a method of cooling molten thermoplastic materials to obtain materials, still in a molten state, that can be treated or processed by conventional means. Another object of this invention is to provide an improved cooling apparatus wherein molten thermoplastic materials may be cooled by contacting them with a vaporizable coolant.

Still another aspect of this invention will be apparent to those skilled in the art from a study of the disclosure, drawings and appended claims.

Although this invention can be used in any system wherein molten thermoplastic materials are partially cooled, it is particularly useful in cooling pyrolyzed or viscosity-broken polymers. The viscosity-breaking step involves the use of high temperatures with the resulting viscosity-broken polymer often too hot to extrude or mold requiring it to be partially cooled before such treatment is attempted. This invention involves a unique method of cooling by contacting a vaporizable coolant with the molten material to be cooled.

The molten thermoplastic material to be cooled is mixed with the coolant and impinged on an impingement surface through a nozzle located in a closed cooling chamber. The coolant-thermoplastic mixture discharged from the nozzle is directed against the impingement target and the partially cooled thermoplastic strikes the target and flows across it being further cooled by contact with the coolant vapors contained in the cooling chamber. The cooled thermoplastic then flows off the target into the bottom of the cooling chamber and is withdrawn in the molten state. The impingement target may be mounted in a rigid position or movably suspended inside the cooling chamber in any manner as to allow the thermoplastic-coolant mixture to impinge on it and to allow the partially cooled thermoplastic to flow across its surface and contact the coolant inside said cooling chamber. The vaporized coolant can be easily withdrawn from the top of the cooling chamber. However, the cooled molten thermoplastic and the vaporized coolant may be separated in any conventional means known to the art such as passing the mixture to a cyclone separator to allow discharge of the molten thermoplastic from the bottom of the cyclone separator and discharge of the coolant from the top of the cyclone separator. By using a cyclone separator it is possible to operate without a separate cooling chamber by spraying the thermoplastic-coolant mixture in tangential contact with the wall of the cyclone because there is sufficient contact between the molten thermoplastic and the coolant as they are swirled around the side of the cyclone to effect the desired cooling. It is often desirable to mount baffles in the base of the cyclone separator in a vertical position extending radially toward the center of the cone-shaped space to provide further agitation and contact between the molten thermoplastic and the coolant as they strike said baffles while being swirled around the sides of the separator.

To increase the efficiency of the above described cooling chamber, it is often desirable to place a baffle above the target surface to increase the contact time between the coolant vapors and the molten thermoplastic. Thus when the coolant is vaporized, the baffle will hold the vapors next to the molten thermoplastic instead of it allowing them to rise to the top of the chamber. The baffle will thus force the vaporized coolant to flow along the entire length of the rigid target surface supporting the hot thermoplastic material. This added contact between the coolant and the hot thermoplastic material greatly increases the efficiency of the cooling system.

In order to more clearly describe the invention and provide a better understanding thereof, reference is made to the accompanying drawings.

FIGURE 1 is a diagrammatic illustration of an apparatus suitable for carrying out the present invention.

FIGURE 2 is a diagrammatic ilustration of another apparatus suitable for carrying out the present invention.

FIGURE 3 is a diagrammatic illustration of still another apparatus suitable for carrying out the present invention.

The apparatus of FIGURE 1 comprises a closed tang 1 having a stationary target plate 2 positioned inside in such a manner that said target plate extends from wall to wall of the cooling tank and is inclined with respect to the axis of tank 1. Polymeric materials are fed into the system through feed hopper 3 which is connected to extruder 4. The outlet of extruder 4 is connected to viscosity-breaking zone 5 where the polymeric materials are heated and viscosity-broken as they are forced through the heated viscosity-breaking zone. The viscosity broken polymer is then mixed with coolant as the coolant is added through line 6. The coolant and viscosity broken polymer are mixed as they flow through line 7 and are discharged through nozzle 8 on to the elevated side of target plate 2 inside the closed cooling chamber. The partially cooled polymer strikes target plate 2 and flows down the plate and falls into the polymer collecting chamber 9 where it is withdrawn as cooled molten polymer through line 10. The vaporized coolant rises through the cooling chamber and is withdrawn through line 11. To increase the efficiency of the system, baffle plate 12 can be installed in the cooling chamber in such a position that it is generally parallel to target plate 2. Baffle plate 12 extends from wall to wall of the cooling chamber, thus preventing the vaporized coolant from immediately rising and being carried away from the polymeric material as it flows across plate 2. The coolant must flow across the full length of target plate 2 before it rises in the cooling chamber to be withdrawn through line 11.

FIGURE 2 very closely resembles FIGURE 1 with the only difference being in the target design and construction within the cooling chamber. A stationary ellipsoidal target 13 is positioned in the center of the cooling chamber and may be held in place by any suitable means such as by the use of rods or legs secured to the interior of the cooling chamber and connected with the target. All other components are the same as set forth in the preceding paragraph describing FIGURE 1.

FIGURE 3 shows the specific embodiment of using a cone-shaped tank 1, often referred to as a cyclone separator as a cooling chamber. The polymer-coolant mixture is sprayed into the cooling chamber through nozzle 8 near the top of tank 1. Nozzle 8 is oriented in such a manner as to cause the polymer-coolant mixture to be sprayed in tangential contact with the wall of tank 1. Thus the said mixture is swirled around the wall of cone-shaped tank 1, at high velocity, and sufficient contact between the polymer and coolant occurs to effect the desired cooling. Gravitational forces pull the molten plastic downward as it is swirled around the wall of cone-shaped tank 1 and causes it to strike baffle plates 14 connected to the wall of tank 1 in a vertical position and extending radially toward the center of tank 1. Baffle plates 14 provide additional agitation of the molten polymer and increases the contact between the molten polymer and the coolant. After striking baffle plates 14, the cooled molten plastic flows into the base of tank 1 and is withdrawn through line 10. All other components are the same as set forth in the above paragraph describing FIGURE 1.

The coolant used in this invention can be any fluid that is chemically inert toward the hot thermoplastic material and may be either a gas or a liquid which will vaporize when contacted with the hot thermoplastic material during the cooling step. Since the coolant is withdrawn from the top of the cooling chamber as a vapor, and the cooled molten thermoplastic material is withdrawn from the bottom of the cooling chamber, it is highly desirable that all of the coolant be vaporized during the cooling process to prevent contamination of the cooled molten themoplastic product by the presence of a liquid phase of coolant with the molten thermoplastic material. However, it is possible to effect cooling of the molten thermoplastic material by using a coolant that will not fully vaporize during the cooling step. When such a coolant is used, additional steps and means, not shown, but well known to those skilled in the art, are provided for separation of the liquid phase of a coolant and the molten thermoplastic material in the base of the cooling chamber. Therefore, a low boiling liquids are preferably used as a coolant when liquid coolants are desired with the assurance that they will be completely vaporized during contact with the hot thermoplastic materials. Particular low boiling liquids that are chemically inert when mixed with the hot thermoplastic materials are well known to those skilled in the art. A few suitable examples of such low boiling liquid coolants are water, low boiling alcohols such as methyl alcohol, ethyl alcohol and isopropyl alcohol, halogenated low boiling paraffins such as carbon tetrachoride, dichlorodifluoromethane, methyl chloride and ethyl chloride, low boiling hydrocarbons such as propane, butane, pentane, hexane, heptane and octane, and the like. On advantage of using liquid coolants in this invention is that the high heat capacity per unit volume as well as the high heat of vaporization of the liquid during the cooling process provide a substantial amount of cooling for each unit volume of coolant used. As mentioned before, the coolant may be an inert gaseous material as it is contacted with the hot thermoplastic material. The suitable gases that may be used for such a purpose are well known to those skilled in the art. A few examples are steam, nitrogen, natural gas, carbon dioxide, and the like. The coolant and the hot thermoplastic materials are mixed as they flow through the feed line to the spray nozzle and then further mixed as they are sprayed on the stationary target surface in the cooling chamber. Then as the partially cooled thermoplastic material strikes the surface of the stationary target and flows across it, the vaporized coolant in the cooling chamber contacts it, producing further cooling. The amount of cooling will depend on the amount of surface area available for the molten thermoplastic material to flow across. The larger the surface of the target, the larger the surface of contact between the molten thermoplastic material and the coolant vapors, thus providing a higher degree of cooling. The viscosity of the molten thermoplastic material will also affect the rate of cooling with the more viscous materials cooling more slowly than free flowing fluids.

One of the difficulties encountered in the treatment of thermoplastics at high temperatures is degradation of the thermoplastic which results when it is contacted with oxygen. Since such degradation is often undesirable, it is within the scope of this invention to minimize the polymer degradation by maintaining an oxygen free cooling system. This is conveniently effected by maintaining a positive operating pressure inside the cooling chamber, thus preventing oxygen from entering the cooling chamber and coming in contact with the hot polymeric material. Therefore the cooling chamber and piping system will usually be constructed in such a manner as to withstand a positive internal operating pressure.

The temperature of the cooled molten thermoplastic will be dependent upon the temperature of the hot thermoplastic as well as the temperature of the coolant. Therefore, the temperature of the cooled molten thermoplastic can be controlled by varying the amounts of the hot thermoplastic and of the coolant. Any conventional means for regulating the flow of the hot thermoplastic material and the coolant into the system can be used. Thus one conventional method of controlling the temperature of the cooled molten thermoplastic would be by regulating the amount of coolant added to the thermoplastic stream by use of a temperature sensing device in the base of the thermoplastic cooling chamber communicating with and setting a control valve on the coolant inlet line. However, it should be noted that any suitable control system known to the art may be utilized in the control of the cooling system of this invention.

In order to further illustrate the invention, the following example is presented.

*Example*

An apparatus similar to the one shown in FIGURE 1 is constructed from a cylindrical tank, having a diameter of 5 feet and a height of 10 feet. The tank is equipped with a cone bottom and a metal target plate is welded to the inside of the cooling tank so that it is inclined with respect to the axis of the tank. The elevated end of the target plate is welded to the wall of the tank about 6 inches from the top of the tank. The target plate extends from wall to wall of the cooling tank. The lower edge of target plate does not connect with the wall of the tank, thus allowing materials to flow off the target plate and to fall into the cone shaped bottom. The target plate is inclined on approximately a 30° angle from the axis of the tank and the distance from the point at which it is welded to the tank wall to the lower edge where the materials drop into the cone shaped base is 8 feet. A metal baffle plate is positioned above and parallel to the metal target plate so that the space between the baffle plate and the target plate is approximately 6 inches. The baffle plate is also welded to the walls of the cooling tank and extends from wall to wall of the tank at all points except at the lower edge where it is not connected to allow steam rising from the target plate to rise into the upper portion of the cooling tank. 1500 pounds per hour of viscosity-broken polyethylene having a specific gravity of 0.963 and a melt index of 5.6 and 9,000 pounds per hour of saturated steam at 300 pounds per square inch absolute are mixed as they flow through the inlet line communicating with the nozzle inside the cooling chamber at the elevated end of the inclined target plate. The viscosity-broken polyethylene is at a temperature of 700° F. before mixing with the steam. The mixture of viscosity-broken polymer and steam is then sprayed on the elevated end of the target plate. As the viscosity-broken polymer strikes the target plate, it flows down the inclined target plate and is further cooled by the steam contacting it as the steam flows through the parallel space between the target plate and the baffle plate. At the lower end of the target plate, the cooled molten polymer flows into the cone shaped base of the cooling tank and is withdrawn at a temperature of about 460° F. The steam rising from contact with the hot polymer flows past the lower end of the baffle plate and rises in the cooling chamber where it is withdrawn through a conduit in the top of the vessel at 440° F. The cooling chamber operates at a pressure of 200 pounds per square inch absolute.

The preceding discussion and example have been directed to only a few preferred embodiments of the invention and it is to be understood that many variations and modifications may be made in the apparatus and procedure without distinguishing from the broad scope of the invention.

We claim:

1. Apparatus for the production of molten thermoplastic material which comprises in combination, extrusion means for a thermoplastic material, viscosity-breaking means associated with said extrusion means to reduce the viscosity of said thermoplastic material, conduit means for introducing and mixing a coolant with said thermoplastic material, means to introduce a mixture of said coolant and thermoplastic material into a closed cooling tank, said cooling tank having disposed therein a target surface below the point of introduction of said mixture of thermoplastic material and coolant, said target surface being in an inclined position in relation to the horizontal plane of said cooling tank and secured to the walls of said cooling tank at the top and sides thereof, baffle means positioned above and parallel to said target surface, means to spray said mixture of thermoplastic and coolant on the upper side of said target surface, conduit means communicating with the upper area of said cooling tank and above both the target surface and baffle means to remove vaporized coolant from said cooling tank, and means communicating with the lower area of said cooling tank and below both the target surface and baffle means to remove molten thermoplastic material from said cooling tank.

2. Apparatus for the production of molten thermoplastic material which comprises in combination, extrusion means for a thermoplastic material viscosity-breaking means associated with said extrusion means to reduce the viscosity of said thermoplastic material, conduit means for introducing and mixing a coolant with said thermoplastic material, means to introduce the resulting mixture of said coolant and thermoplastic material into a closed cooling tank, said cooling tank having disposed therein an ellipsoidal target surface below the point of introduction of said mixture of thermoplastic material and coolant, means for spraying said mixture on the upper end of said ellipsoidal target surface, conduit means communicating with the upper area of said cooling tank and above said ellipsoidal target surface to remove vaporized coolant from said cooling tank and means communicating with the lower area of said cooling tank and below said ellipsoidal target surface to remove molten thermoplastic material from said cooling tank.

3. Process for the production of a cooled molten thermoplastic material which comprises intimately contacting a first stream of a hot thermoplastic material with a second stream of fluid coolant, passing the resulting mixture of hot thermoplastic and coolant to a cooling zone, spraying said mixture onto a target surface disposed in said cooling zone, flowing the molten thermoplastic mixture along the surface of said target while vaporizing the coolant content of same, maintaining the vaporized coolant in close association with the thermoplastic material along said target surface, removing the thus cooled molten thermoplastic material esentially free of coolant from said cooling surface, removing vaporized coolant from said cooling zone, and thereafter withdrawing the cooled molten thermoplastic material from said cooling zone.

4. A process according to claim 3 wherein the coolant is water.

5. A process according to claim 3 wherein the coolant is steam.

6. A process according to claim 3 wherein the coolant is nitrogen.

7. A process according to claim 3 wherein the coolant is carbon dioxide.

8. A process according to claim 3 wherein the coolant is natural gas.

References Cited in the file of this patent

UNITED STATES PATENTS

| | | |
|---|---|---|
| 2,062,374 | Noel | Dec. 1, 1936 |
| 2,809,820 | Stoops | Oct. 15, 1957 |
| 2,951,351 | Spelling | Sept. 6, 1960 |
| 3,004,406 | Foote et al. | Oct. 17, 1961 |